(12) United States Patent
Schiegg et al.

(10) Patent No.: US 11,661,067 B2
(45) Date of Patent: May 30, 2023

(54) METHOD FOR ASCERTAINING DRIVING PROFILES

(71) Applicant: Robert Bosch GmbH, Stuttgart (DE)

(72) Inventors: Martin Schiegg, Korntal-Muenchingen (DE); Muhammad Bilal Zafar, Renningen (DE); Stefan Angermaier, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 467 days.

(21) Appl. No.: 16/828,061

(22) Filed: Mar. 24, 2020

(65) Prior Publication Data

US 2020/0331473 A1 Oct. 22, 2020

(30) Foreign Application Priority Data

Apr. 16, 2019 (DE) .......................... 102019205519.2

(51) Int. Cl.
*B60W 30/182* (2020.01)
*G06N 20/00* (2019.01)
*B60W 40/09* (2012.01)
*B60W 50/08* (2020.01)
(Continued)

(52) U.S. Cl.
CPC .......... *B60W 30/182* (2013.01); *B60W 40/09* (2013.01); *B60W 50/082* (2013.01); *B60W 50/085* (2013.01); *G06N 3/049* (2013.01); *G06N 20/00* (2019.01); *B60W 2050/0075* (2013.01); *B60W 2556/10* (2020.02)

(58) Field of Classification Search
CPC .......... B60W 30/182; B60W 2556/10; B60W 50/085; B60W 50/082; B60W 40/09; G06N 20/00; G06N 3/049
See application file for complete search history.

(56) References Cited

U.S. PATENT DOCUMENTS

| 11,078,857 B2 * | 8/2021 | Schiegg ............. F02D 41/1444 |
| 2005/0166580 A1 | 8/2005 | Pfaeffle et al. |
| 2018/0364725 A1 | 12/2018 | Lonari |

(Continued)

FOREIGN PATENT DOCUMENTS

| DE | 102013200116 A1 | 7/2014 |
| DE | 102017107271 A1 | 7/2017 |
| EP | 2610836 A1 | 7/2013 |

*Primary Examiner* — Kenneth J Malkowski
(74) *Attorney, Agent, or Firm* — Norton Rose Fulbright US LLP; Gerard Messina

(57) ABSTRACT

A computer-implemented method for training a machine learning system to generate driving profiles of a vehicle. The method includes first travel routes are selected from a first database having travel routes, a generator of the machine learning system receives the first travel routes and generates first driving profiles for each of the first travel routes, travel routes and associated driving profiles determined during vehicle operation are stored in a second database, second travel routes and respective associated second driving profiles determined during vehicle operation are selected from the second database, a discriminator of the machine learning system receives pairs made up of one of the first travel routes with the respective associated first generated driving profile and pairs made up of second travel routes with the respective associated second driving profile determined during vehicle operation, as input variables.

24 Claims, 2 Drawing Sheets

(51) Int. Cl.
*G06N 3/049* (2023.01)
*B60W 50/00* (2006.01)

(56) References Cited

U.S. PATENT DOCUMENTS

2019/0012581 A1    1/2019  Honkala et al.
2019/0048809 A1*   2/2019  Fox ..................... B60W 20/20
2019/0226855 A1*   7/2019  Fu ............................ G06N 3/08

* cited by examiner

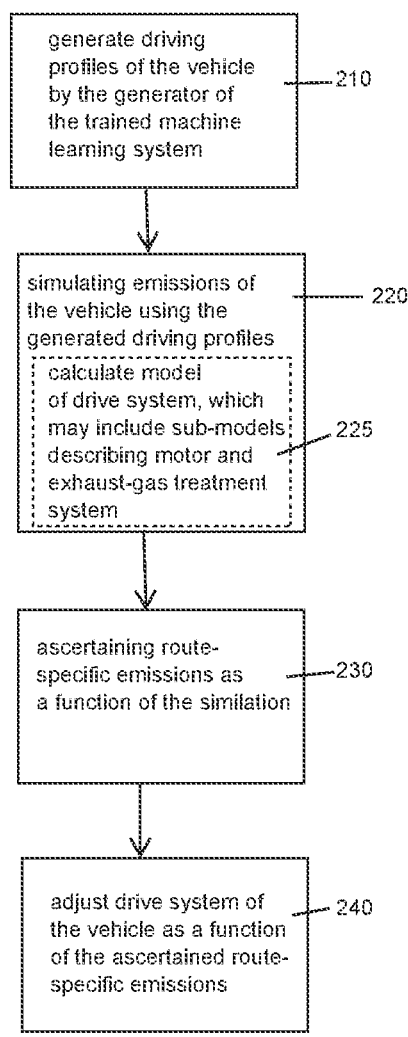

METHOD FOR ASCERTAINING DRIVING PROFILES

CROSS REFERENCE

The present application claims the benefit under 35 U.S.C. § 119 of German Patent Application No. DE 102019205519.2 filed on Apr. 16, 2019, which is expressly incorporated herein by reference in its entirety.

FIELD

The present invention relates to computer-implemented methods for generating or evaluating driving profiles of a vehicle with the aid of a machine learning system, a computer-implemented method for training such a machine learning system, as well as computer programs and learning systems created for that purpose.

BACKGROUND INFORMATION

German Patent Application No. DE 10 2017 107 271 A1 describes a method for ascertaining a master driving cycle for vehicle road testing to determine exhaust emissions of motor vehicles. In that case, speed profiles for the various driving cycles are derived on the basis of the sets of parameters. The goal is to ascertain a master cycle that, to the greatest extent possible, reflects the "maximum" case of emissions within given boundary conditions.

SUMMARY

In some countries, the legislation provides for making the admission of new motor vehicles which are powered by an internal combustion engine, dependent on the emissions that result during practical vehicle operation. The term "real driving emissions" is also customary for this. For example, such motor vehicles include those which are powered solely by a combustion engine, but also those having a hybridized drivetrain.

To that end, it is provided that a tester traverse one or more driving cycles with the motor vehicle, and that the emissions developing in so doing be measured. The admission of the motor vehicle is then dependent on these measured emissions. In this connection, the driving cycle may be freely selected within further limits by the tester. A typical duration of a driving cycle here may be 90-120 min., for example.

Consequently, in developing motor vehicles, manufacturers of motor vehicles are presented with the challenge of having to already predict early on in the development process of a new vehicle, whether the emissions of this vehicle do or do not remain within the limits required by law in every permissible driving cycle.

It is therefore important to make methods and devices available which, already in the development stage of a motor vehicle, are able to reliably predict the anticipated emissions of the vehicle in order to be able to make changes to the vehicle in case of a foreseeable exceeding of limit values. Such an assessment solely on the basis of measurements on a test bench or in a traveling vehicle is extremely costly because of the large variety of possible driving cycles.

Therefore, in the related art, it is proposed, for example, to determine what are referred to as master cycles for which compliance with emissions standards is particularly challenging. In so doing, it is assumed that if emission standards are satisfied for the most challenging cycles, presumably they will be satisfied for all possible driving cycles.

However, in addition to the requirement of having to comply with exhaust emission regulations in every possible or permissible driving cycle, a major goal of vehicle or drivetrain engineering is to minimize the overall emissions of a vehicle drive system in real-world operation. Although it is possible that adjusting or optimizing a vehicle drive system to the most critical or especially critical driving cycles may ensure compliance with standards in all cycles, as a consequence, there is the danger that emissions in less critical cycles will worsen considerably. If the less critical cycles are the more frequent cycles in real vehicle operation, which is often the case, then the overall system worsens in terms of emissions during real-world operation owing to such an optimization. For example, optimization of the emissions to a driving cycle that is critical but very rare in reality, having an extreme speed profile (e.g., extreme uphill driving with sharp accelerations) may result in a worsening of emissions for less critical, but instead much more frequent driving cycles with a customary speed profile (e.g., short urban trip with traffic lights), which may lead to higher emissions overall during real-world operation.

That is why it is of great advantage for the development of emissions-optimized vehicles having combustion engines, to be able to automatically generate a large number of realistic speed profiles, whose distribution of generated speed profiles corresponds to or approximates a distribution to be expected in the real world. The goal is thus generated speed profiles having a distribution representative for real-world operation.

In addition to the development of low-emission drive systems or an emissions-optimized application of such drive systems, such generated speed profiles may also be used advantageously in the case of predictive driving, e.g., in battery management of an electric vehicle or E-bike, drive management of a hybrid vehicle or regeneration management of exhaust-gas components of a vehicle having a combustion engine. Speed profiles generated in this way may also play an important role in determining collective loads and stress scenarios for the specification of components, for example, what stress a specific component such as a pump will experience over its lifetime.

Therefore, the computer-aided generation of speed profiles in distribution representative for real-world operation represents an important technical problem which may significantly improve the development or optimization of a vehicle in various scenarios and therefore contribute to lower-emission and more efficient vehicles, especially to lower-emission and more efficient drive systems of vehicles.

Thus, in a first aspect of the present invention, an example computer-implemented method is provided for training a machine learning system to generate driving profiles of a vehicle.

In this context, driving profiles denote curves of driving properties of a vehicle, the driving properties in particular being physical or technical properties of the drivetrain of the vehicle that are measurable with sensors and which characterize the locomotion of a vehicle. Among the driving profiles, speed profiles of the vehicle are the most important variant. The speed profile of a vehicle is one or the reference value for determining emissions, consumption, wear and comparable values for a specific trip. In this context, a speed profile may be determined by speed values, but also by values such as acceleration values derivable from them. Other essential driving properties whose curves are important for applications such as determining emissions, consumption or wear include, namely, a position of the accelerator pedal or a transmission ratio.

In this context, the example training method in accordance with the present invention has the following steps:
- first travel routes are selected from a first database having travel routes,
- a generator of the machine learning system receives the first travel routes as input variables and generates associated first driving profiles for each of the first travel routes,
- travel routes and, in each instance, associated driving profiles determined during vehicle operation are stored in a second database,
- second travel routes as well as respective associated second driving profiles determined during vehicle operation are selected from the second database,
- a discriminator of the machine learning system receives pairs made up of one of the first travel routes with the respective associated first generated driving profile and pairs made up of second travel routes with the respective associated second driving profile determined during vehicle operation, as input variables,
- depending on the input variables, the discriminator calculates outputs which, for each pair received as input variables, characterize or map or quantify whether it is a pair having a first generated driving profile or a pair having a second driving profile determined during vehicle operation,
- depending on the outputs of the discriminator, an objective function is calculated, especially optimized, which represents or maps or quantifies a distance or a divergence between the distribution of the pairs having first generated driving profiles and the distribution of the pairs having second driving profiles determined during vehicle operation.

In this instance, the first database and the second database may be realized as one (joint) database.

Preferably, depending on the optimization of the objective function, parameters of the machine learning system are adjusted in such a way that
a. the discriminator is optimized to distinguish between the first generated driving profiles and the second driving profiles determined during vehicle operation,
b. the generator is optimized to generate first generated driving profiles in a first distribution that are as difficult as possible for the discriminator to distinguish from second driving profiles determined during vehicle operation, which are in a second distribution.

In one preferred refinement of the present invention, the parameters of the example machine learning system are adjusted depending on a gradient of the objective function.

The training processes described provide a computer-implemented machine learning system with which representative driving profiles are able to be generated, whereby in turn measures may be taken such as emissions optimization or validation of a system in terms of emissions, taking into account the actual representative effects.

The objective function is implemented preferably as a statistical distance like, e.g., a Jenson-Shannon divergence. Preferably, the objective function is implemented as a Wasserstein metric, particularly a Wasserstein distance between a first distribution of the first driving profiles and a second distribution of the second driving profiles. Thus, the distribution of the generated data advantageously reflects the full variance of the distribution of the measured data, and a so-called mode collapse is prevented. In addition, more stable and more efficient training and better convergence are made possible, since this objective function prevents vanishing gradients. The objective function is robust as regards too many optimization steps in the case of the discriminator. In order to optimize the use of a Wasserstein metric as objective function, in preferred embodiments, it is proposed to expand the objective function by a regularization or to carry out a weight clipping.

In one preferred development of the present invention, route characteristics of the first travel routes are generated at least in part by a machine learning system, particularly a neural network. It thereby becomes possible to generate a very large number of driving profiles for a multitude of automatically generated routes or route characteristics. The routes or route characteristics generated in such a way are subject to fewer restrictions than actually measured routes. In addition, it is costly and technically challenging to acquire route data with a multitude of complete route characteristics.

In addition to the first travel routes and the second travel routes, the input variables of the generator and of the discriminator may in each case include additional information, especially driver characteristics and/or vehicle characteristics. By such—especially also not discretized—additional information, the driving profiles may be conditioned to further variables, as well, e.g., motorization of the vehicle or experience of the driver, which permits more precise adjustments and conclusions as a function of the generated driving profiles.

In one advantageous refinement of the present invention, the generator receives random variables from a random generator as further input variables and generates the first driving profiles corresponding to the respective first travel routes as a function of the first travel routes and the random variables. This improves the efficiency of the training process. In this context, first of all, the random variables may be implemented either as global random vectors, or as temporary or local random vectors. Alternatively, the random variables may also be implemented as a combination of global and of temporary or local random vectors. The combination of global and temporary/local random vectors turns out to be particularly advantageous, since variances in the data may thus be mapped both on the basis of global as well as on the basis of local or temporary influences.

In preferred embodiments of the present invention, the generator and/or the discriminator is/are implemented in each instance as a neural network, particularly as a recurrent neural network. As a result, driving profiles of any length may also be generated or evaluated, the transitions between sections of the driving profiles always being consistent with the learned transition model. In this instance, the recurrent neural network may be implemented particularly as a long short-term memory (LSTM) neural network or as gated recurrent units (GRU).

In preferred embodiments of the present invention, it also becomes advantageously possible to take into account so-called anticipatory driving. In so doing, it is taken into consideration that through driver behavior or automatic vehicle interventions, the speed of a vehicle may already be adjusted to future or subsequent route characteristics, e.g., due to an already visible traffic light, a known following speed limit, etc. To that end, in one preferred refinement, the generator may be implemented as a bidirectional recurrent neural network. For the generation of the driving profiles by the generator, in addition, route characteristics of the first travel routes in one specific discretization step, especially a specific point in time or a specific section distance, may be supplemented or expanded by route characteristics of a following discretization step, particularly of a following point in time or a following section distance, or by several following steps.

In further presented aspects of the present invention, the elements of the example machine learning system trained with the training processes described may be utilized as computer-implemented systems to generate (generator) or to evaluate (discriminator) driving profiles. (Step 210, FIG. 2).

In particular, depending on driving profiles generated in such a way, route-specific emissions of a drive system of a vehicle may be ascertained (step 230, FIG. 2), for example, in a simulation (step 220, FIG. 2) in which a model of the drive system is calculated (step 225, FIG. 2). Such a model may include sub-models, as well, which describe a motor and an exhaust-gas treatment system of the drive system. (Step 225, FIG. 2)

With route-specific emissions of a drive system of a vehicle ascertained as a function of driving profiles generated in this manner (step 230, FIG. 2), a validation or adjustment of the drive system (step 240, FIG. 2) may then in turn be carried out, particularly an emissions-minimizing adjustment.

As described above in this connection, owing to the representative distribution of the generated driving profiles, an adjustment may be carried out which does not optimize the drive system in terms of emissions to individual or especially critical driving profiles. Rather, optimization of the drive system in this manner permits an overall minimization of the emissions to be expected during real-world operation.

In so doing, the optimization may be realized by an adjustment of components or parameters during the development of the drive system, by an adjustment of data in an application of the drive system or by an adjustment of controlled variables during the operation of the drive system in the vehicle.

In order to carry out the example computer-implemented methods described herein, computer programs may be created and stored in machine-readable memories. A computer-implemented learning system including such a machine-readable memory may be set up to carry out the methods, the calculations to be carried out being performed by one or more processors of the computer-implemented learning system.

BRIEF DESCRIPTION OF THE DRAWINGS

FIG. 2 shows a flowchart according to an example embodiment of the present invention.

DETAILED DESCRIPTION OF EXAMPLE EMBODIMENTS

Figure 1:
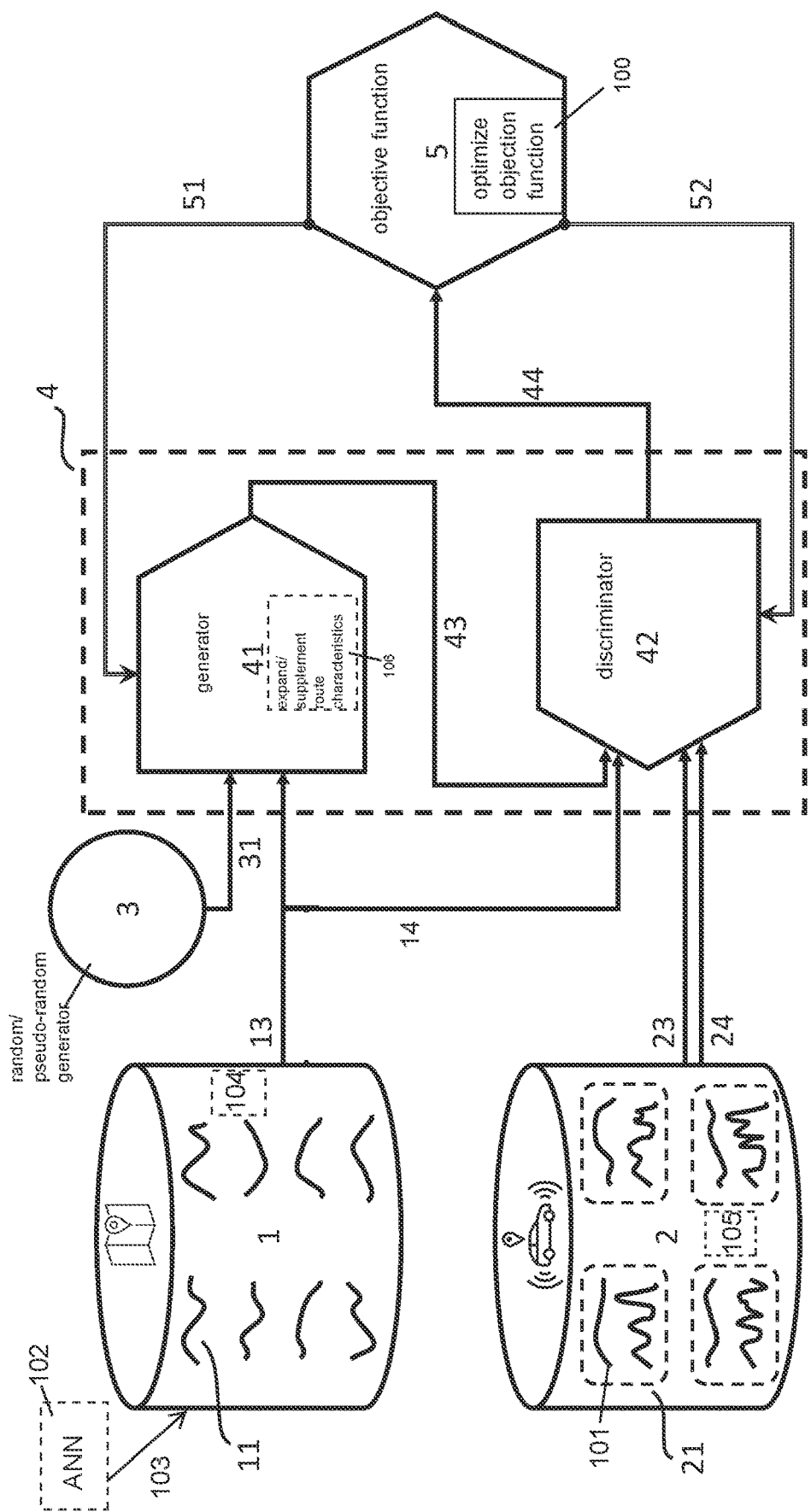
FIG. 1 shows, by way of example, a computer-implemented training process for a machine learning system.

Travel routes or routes of vehicles are stored in a database 1.

An exemplary route in database 1 is denoted by 11 in FIG. 1. Travel routes or routes of vehicles together with, in each instance, an associated driving profile are stored in a database 2. An exemplary pair of route (101) and associated driving profile in database 2 is denoted by 21 in FIG. 1. In this context, the driving profiles in database 2 correspond to driving profiles determined or measured during travel operation of the vehicle. That is, preferably the driving profiles were recorded by sensors of a vehicle during actual travel by the vehicle through the associated route, and stored. Within the overall system, databases 1 and 2 are implemented specifically in machine-readable memories. In this instance, only data stored systematically in a machine-readable memory is denoted by the term database.

In machine learning system 4, the intention is now to train a generator 41 to generate driving profiles for routes in database 1. Preferably, these driving profiles are to be determined as a function of random input variables, for which random variables like random vectors may be made available in block 3. In particular, a random generator, which may also be a pseudo-random generator, may be implemented in block 3.

Preferably, to the greatest extent possible, the driving profiles generated by generator 41 should be indistinguishable, or scarcely distinguishable, from the driving profiles from database 2 ascertained during vehicle operation. Moreover, a discriminator 42 is trained to be able to distinguish as well as possible between driving profiles generated by generator 41 and driving profiles drawn from database 2, that is, between the respective pairs of driving profiles and route characteristics. At the same time, the learning system is not only intended to generate individual driving profiles that to the greatest extent possible, are indistinguishable or scarcely distinguishable from individual driving profiles ascertained during vehicle operation. Rather, the distribution of the generated driving profiles within the parameter space of the input variables should be as close as possible to the distribution of the driving profiles within the parameter space of the input variables ascertained during vehicle operation, thus, the intention is to achieve a representative distribution of driving profiles.

Moreover, the training of machine learning system 4 includes the optimization of an objective function 5, in dependence upon which, parameters of generator 41 and of discriminator 42 are adjusted (51, 52, respectively).

The example training of machine learning system 4 in accordance with the present invention is described in greater detail below with reference to FIG. 1.

A route in database 1 is stored specifically as a sequence of discrete data points, for each data point or each discretization step, route characteristics being stored in this discretization step.

For example, a route r in database 1 has a length N: $r=(r_1, \ldots, r_N)$. Each data point $r_t$ corresponds to one discretization step. Realizations in which the discretization steps correspond to a temporal or spatial discretization are especially preferred. In the case of the temporal discretization, each of the data points corresponds to a time elapsed since the beginning of the route, and consequently, the sequence of data points corresponds to a time characteristic. In the case of the spatial discretization, each of the data points corresponds to a distance traveled along the route.

As a rule, the sampling rate is constant. In a temporal discretization, the sampling rate may be defined, e.g., as x seconds, in a spatial discretization, e.g., as x meters.

Each data point $r_t$ of the route describes the route characteristics in respect to the corresponding discretization step, that is, $r_t \in R^D$. D is the number of route characteristics, each dimension of multi-dimensional route characteristics being counted here as one dimension of a one-dimensional route characteristic.

For example—in each instance specific to the discretization step, particularly the point in time or time interval, or the location or section or distance—such route characteristics may be:

Geographic characteristics such as absolute altitude or gradient

Characteristics of the traffic flow such as average speed of the traffic as a function of time Roadway characteristics such as number of traffic lanes, type of roadway or roadway curvature Characteristics of traffic management such as speed limits, number of traffic lights or number of certain traffic signs, particularly stop or yield right-of-way or pedestrian crosswalks Weather characteristics such as amount of rainfall at the given point in time, wind speed, existence of fog.

A route is selected from database 1 and transmitted in step 13 to generator 41.

In addition, preferably a random vector is ascertained in block 3 and transmitted to generator 41 in step 31. A random vector z is drawn, that is, is ascertained randomly. In this instance, in particular, $z \in R^L$ applies, where L may optionally be a function of the length of route N. The distribution from which z is drawn is preferably fixed at a simple distribution family, e.g., Gaussian distribution or uniform distribution.

The input variables of generator 41 are now made up preferably of the variables: random vector z and route r. Unlike in the case of an input into generator 41 generated purely randomly, the generated driving profiles may thus be conditioned to specific route characteristics. For example, by sampling various zs, different driving profiles may be generated for the same specified route r. In this context, the route characteristics of routes r in database 1 may be actually measured route characteristics, route characteristics defined by experts or route characteristics learned by a machine learning system (103), e.g., a neural network 102. Routes having route characteristics created from two or three of these variants may also be held ready in database 1.

In one exemplary application case in which the generated driving profiles are used to determine emissions properties of a drive system of a vehicle, by selectively altering a few route characteristics, generating matching driving profiles and simulating the emissions for these profiles, for example, it is possible to purposefully analyze the extent to which certain route characteristics influence the development of emissions in the combustion process. For example, this allows targeted optimization of the parameters of the drive system for certain, e.g., for especially demanding route profiles, especially parameters of a control of the drive system, e.g., in a control unit.

As a function of the random vector (step 31) and selected route (step 13) input variables, generator 41 now generates a driving profile. To that end, generator 41 is equipped with a computer-implemented algorithm with which a generative model is realized, and outputs the driving profile (step 43).

Such a driving profile generated by generator 41 may be output as $x=(x_1, \ldots, x_N)$, for example, and thus have the same length N as the route to which it was conditioned. Alternatively, however, the route characteristics may also be discretized, for example, via the location, the generated speeds nevertheless being discretized via the time. To this end, after each individual step, from the previous location the next discretization point in time may be calculated via the generated speed, and the route characteristics at this location may then be used as input for $x_{(t+1)}$.

The driving profile is conditioned to the route selected from database 1 and transmitted to the generator. The variance of the possible driving profiles for one and the same route is mapped via the random distribution of z. The generative model is parameterized using parameters $\theta_G$. For example, the architecture of the generative model may be a recurrent neural network. The computer implementation of the generator is accomplished by storing of the algorithm which realizes the generative model, as well as the parameters of the model in a machine-readable memory, by execution of the calculation steps of the algorithm by a processor, as well as by storing the generated driving profiles in a machine-readable memory.

In one possible development, the driving profiles may be generated with a fixed length, that is, with a defined number of discretization steps or data points. When generating longer driving profiles, several brief generated time series would then have to be linked together. In so doing, however, as a rule, the transitions would not be consistent. In an alternative embodiment, the method may be expanded in such a way that driving profiles of any length may also be generated or evaluated, and the transitions are always consistent with the learned transition model. To that end, preferably both the generator and the discriminator are implemented as a recurrent neural network, e.g., as a long short-term memory (LSTM) neural network or gated recurrent units (GRU). Architecturally, the generator is implemented preferably as a sequence-to-sequence model, but may also be implemented as a vector-to-sequence model. The discriminator is implemented preferably as a sequence-to-scalar model, but may also be implemented as a sequence-to-sequence model.

There are various options for the architecture of the generative model as a recurrent neural network.

For example, one global random vector z may be sampled for the complete driving profile, where the designation global may again relate to a temporal or spatial discretization. In this development, characteristics are taken into account or learned in the latent space, which alter the driving profile globally, for example, characteristics constant over the route such as constant driver characteristics (e.g., age or experience), constant weather characteristics, (e.g., persistent rain) or constant vehicle characteristics (e.g., motorization). This random vector may now be used either to initialize the hidden state in the first time step or/and may be supplied to the recurrent neural network in each time step.

Local or temporary random vectors z may also be sampled, that is, characteristics are taken into account or learned in the latent space which alter the driving profile locally or temporarily, e.g., short-duration characteristics such as short-duration traffic-management characteristics or traffic-flow characteristics (states of traffic lights, intersection congestion, pedestrian on the roadway). In this case, a random vector is generated anew at an interval of M time steps and supplied to the recurrent neural network, where M>0. M may also be stochastic, that is, the random vector may also be changed at random intervals.

In one preferred refinement of the present invention, a combination of global and local or temporary random vectors may also be implemented. In this case, some dimensions of the random vector are sampled only once per driving profile, while the remaining dimensions change every M time steps. Alternatively, in principle, a global random vector may also be supplied to the recurrent neural network in each time step, it being replaced by a local (i.e., newly sampled) random vector every M time steps.

The combination of global and local random vectors turns out to be particularly advantageous, since variances in the data may thus be mapped both on the basis of global as well as on the basis of local or temporary influences.

Preferably, anticipatory or predictive driving may also be taken into account in the generative model.

Thus, in one possible development of the present invention, route characteristics $r_t$ at point in time t may be expanded or supplemented (106) selectively in the calculation by generator 41, by route characteristics $r_{t+1}, \ldots, r_{t+m}$. This development is particularly advantageous in the case of online calculations, that is, when computing resources are limited, or if the influence of later route characteristics can or should be limited to a few discretization steps.

Alternatively, a bidirectional recurrent neural network may be utilized as generative model, in which a hidden state of future cells of the recurrent neural network is additionally taken into account. All possible future time steps may thus explicitly be included.

Therefore, instead of conditioning the generation of a speed at point in time t only to the route characteristics at instantaneous point in time t (as well as possibly to a hidden state of point in time t−1), future route characteristics may also be included for the generation of the speed at point in time t. Therefore, in addition to being conditioned to the route characteristics at point in time t, the generation of the speed at point in time t is also conditioned to route characteristics of points in time t+1, t+2, . . . , t+m (or a subset thereof). This makes it possible to simulate so-called "anticipatory driving", e.g., the early reaction of a driver, especially in the sense of a speed adjustment, to a route characteristic (e.g., traffic light, speed limit, freeway exit, etc.) already visible in the distance. In addition, this permits the algorithm to be able to learn to return to speed 0 at the end of a route, for example, because only default values like, e.g., 0 exist for future route characteristics at the end of a route.

A route (101) in database 2 is stored specifically as a sequence of discrete data points, where for each data point or each discretization step, route characteristics being stored in this discretization step.

For example, a route r (101) in database 2 has a length S: $r=(r_1, \ldots, r_S)$. Each data point $r_t$ corresponds to one discretization step. Realizations in which the discretization steps correspond to a temporal or spatial discretization are especially preferred. In the case of the temporal discretization, each of the data points corresponds to a time elapsed since the beginning of the route, and consequently, the sequence of data points corresponds to a time characteristic. In the case of the spatial discretization, each of the data points corresponds to a distance traveled along the route.

As a rule, the sampling rate is constant. In a temporal discretization, the sampling rate may be defined, e.g., as x seconds, in a spatial discretization, e.g., as x meters.

Each data point $r_t$ of the route describes the route characteristics in respect to the corresponding discretization step, that is, $r_t \in R^D$. D is the number of route characteristics, each dimension of multi-dimensional route characteristics being counted here as one dimension of a one-dimensional route characteristic.

For example—in each instance specific to the discretization step, particularly the point in time or time interval, or the location or the section or distance—such route characteristics may be:
Geographic characteristics such as absolute altitude or gradient
Characteristics of the traffic flow such as traffic density or average speed of the traffic as a function of time
Roadway characteristics such as number of traffic lanes, type of roadway or roadway curvature
Characteristics of traffic management such as speed limits, number of traffic lights or number of certain traffic signs, particularly stop or yield right-of-way or pedestrian crosswalks
Weather characteristics such as amount of rainfall at the given point in time, wind speed, existence of fog.

Preferably, they are the same types of route characteristics which are stored for the routes in the first database.

The routes determined in such a way, together with a respective driving profile actually measured during vehicle operation and corresponding to the route (101), are stored in database 2. These pairs made up of route and associated driving profile serve as training data for the machine learning system. Specifically, pairs made up of route and associated driving profile are selected for this training and transmitted to discriminator 42 in steps 23 and 24. In addition, pairs made up of one route from database 1 and one driving profile generated as a function of this route by generator 41 are also transmitted to discriminator 42 in steps 14 and 43, respectively.

Discriminator 42 is equipped with a computer-implemented algorithm, with which a discriminative model is realized. Discriminator 42 receives a pair, made up of route and associated driving profile, as input variables and decides whether the pair provided contains a driving profile generated (by generator 41) or an actually measured driving profile (obtained from database 2). The result of this decision is output in step 44. For example, discriminator 42 may output a value >0 for the decision "real driving profile" and <0 for the decision "generated driving profile." Alternatively, previously defined values like class labels may also be output, for example. The discriminative model is parameterized using parameters $\theta_D$. In particular, output 44 of the decision includes a valuation beyond the binary decision "yes"/"no."

The computer implementation of the discriminator is accomplished by storing the algorithm which realizes the discriminative model, as well as the parameters of the model, in a machine-readable memory, by execution of the calculation steps of the algorithm by a processor, as well as by storing the output in a machine-readable memory.

For example, discriminator 42 may be implemented as a recurrent neural network. As a result, namely, driving profiles of any length may be evaluated.

There are several designs for the evaluation (decision—generated driving profiles versus driving profiles ascertained during vehicle operation—trajectory). In particular, the evaluation may be provided anew after each individual time step. The global evaluation of the driving profile is then the average of the individual evaluations, for instance, or the majority decision. Alternatively, the evaluation of the total driving profile may also be provided only at the last time step. In particular, the latter design saves on additional calculation steps and has the further advantage that the complete driving profile is taken equally into account in the evaluation.

Depending on output 44 of discriminator 42, in block 5, an objective function is optimized (100), in particular, a loss function is minimized. To that end, the input variables of the discriminator are labeled specifically as real samples (i.e., pairs having driving profiles determined during vehicle operation) or as generated samples (i.e., pairs having driving profiles generated by generator 41). In this context, the objective function characterizes the extent to which the generated driving profiles correspond to driving profiles actually measured, or the extent to which the distribution of the generated driving profiles in the parameter space corresponds to the distribution of the measured driving profiles in the parameter space. Parameters $\theta_G$ of generator 41 or of the generative model implemented there, as well as parameters $\theta_D$ of discriminator 42 or of the discriminative model implemented there are adjusted depending on the adjustment of the objective function. In this connection, the parameters are adjusted especially in terms of the gradient of the objective function.

The objective function is selected in such a way that it characterizes or represents a difference or a distance between the distribution of the generated driving profiles and the distribution of the driving profiles ascertained during vehicle operation, or a difference or distance between the distribution of the route/driving profile pairs having generated driving profiles and the distribution of the route/driving profile pairs having driving profiles ascertained during vehicle operation. By the selection of such an objective function, the machine learning system may be trained in such a way that the distribution of the generated data reflects the full variance of the distribution of the measured data. A so-called mode collapse is prevented. In other words, a representative distribution of the driving profiles is provided. At the same time, the objective function specifically takes into account the variance of the unobservable influences, as well.

To that end, preferably a loss function is selected as objective function, which is implemented as a Wasserstein metric or Wasserstein distance between the distributions.

In this embodiment of the computer-implemented training according to the present invention, by preference, the discriminator is limited to Lipschitz-bounded functions. Moreover, in one preferred development, the objective function is expanded by regularization terms, e.g., a gradient penalty or a centering (i) of the gradient of the real samples (that is, the pair having driving profiles determined during vehicle operation) on 0 or a centering (ii) of the gradient of generated samples (that is, the pairs having generated driving profiles) on 0 or a centering (iii) of the gradient of samples, which represent the mean of real and generated samples, on 1. In this context, the option "to center the gradient of real samples on 0" is especially preferred, since it has turned out to be the fastest of the options and leads to an especially rapid convergence of the optimization problem. Alternatively, a weight clipping may be carried out after each gradient step.

The example methods described above for the computer-implemented training of the overall learning system including generator 41 and discriminator 42 may be described as a min-max training objective. In the process, discriminator 42 maximizes its correct classification rate, while generator 41 minimizes the correct classification rate by generating as many driving profiles as possible which misdirect discriminator 42.

In addition to the described input variables of generator 41, it may also be provided with further input variables, e.g., by storing them in each instance for every travel route in database 1. For example, in addition to the discretized route information, associated information about driver characteristics (such as experience, age, aggressiveness or driving style, etc.) or vehicle information (such as power, motorization, type of drive system, etc.) (collectively 104) may also be stored for each travel route. The generated driving profiles may thus be conditioned to this additional information, as well. In this case, corresponding information (105) for each of the travel routes (101) stored in database 2 is also stored advantageously for the training of machine learning system 4. This additional information both with respect to the route information from database 1 (step 14) as well as with respect to the route information from database 2 (step 23) is made available as input variables to the discriminator.

An example computer-implemented machine learning system which is trained with the training process in accordance with the present invention described above is able to generate representative driving profiles for routes. (FIG. 2, step 210) To that end, input variables of the same type as in the training, thus, especially routes, possibly also random variables and further information, may be supplied to the generator of the machine learning system thus trained, and it generates corresponding driving profiles. Driving profiles generated in this manner may be used for the simulation of emissions of a vehicle (FIG. 2, step 220) and consequently, e.g., for the probabilistic judgment concerning compliance with exhaust emission standards, and for emissions optimization. For instance, the emissions may be optimized by adjusting the drive system during development, by an optimization in the data application of the drive system, e.g., of a control unit for the drive-system control, or by an adjustment of controlled variables of the drive system in the vehicle for emissions optimization. (FIG. 2, step 240) Namely, in the latter case, the driving profiles may be generated in the vehicle.

The driving profiles may also be utilized for the optimization of predictive driving, e.g., in the battery management of an electric vehicle or E-bike, in the drive management of a hybrid vehicle or in the regeneration management of exhaust-gas components of a vehicle having a combustion engine. The optimization may again be carried out during development, by optimizing a corresponding control-unit application or by adjusting controlled variables of the corresponding systems in the vehicle.

Driving profiles generated in this way may also play an important role in determining collective loads and stress scenarios for the specification of components, for example, what stress a specific component such as a pump will experience over its lifetime.

What is claimed is:

1. A computer-implemented method for a vehicle, the method comprising:
   training a machine learning system to generate driving profiles of the vehicle, the training including the following steps:
      selecting first travel routes from a first database, the first travel routes being automatically generated routes;
      receiving, by a generator of the machine learning system, the first travel routes as input variables and generating, by the generator, a respective associated first generated driving profile for each of the first travel routes;
      storing, in a second database, second travel routes and respective associated second driving profiles determined during vehicle operation, each of the respective associated second driving profiles being determined using sensors of a first vehicle during actual travel by the first vehicle through the respective second travel route;
      selecting, from the second database, a plurality of the second travel routes and respective associated second driving profiles determined during vehicle operation;
      receiving, by a discriminator of the machine learning system, as input variables: (i) pairs, each made up of one of the first travel routes and the respective associated first generated driving profile, and (ii) pairs, each made up of one of the selected second travel routes and the respective associated second driving profile determined during vehicle operation;
      determining by the discriminator, depending on the input variables received by the discriminator, outputs which, for each pair received as input variables, characterize whether it is a pair having a first generated driving profile or a pair having a second driving profile determined during vehicle operation; and optimizing an objective function depending on the outputs of the discriminator, the objective function characterizing a distance between (i) a distribution of the pairs having the respective associated first generated driving profiles, and (ii) a distribution of the pairs having the respective associated second driving profiles determined during vehicle operation, wherein the objective function is a loss function, and the optimizing is includes adjusting parameters of the generator and parameters of the discriminator to minimize the loss function.

2. The method as recited in claim 1, wherein the respective associated first generated driving profiles and the respective associated second driving profiles are speed profiles, or curves of acceleration-pedal positions, or curves of a transmission ratio.

3. The method as recited in claim 1, wherein depending on the optimization of the objective function, the parameters of the generator and the parameters of the discriminator are adjusted in such a way that:

the discriminator is optimized to distinguish between the respective associated first generated driving profiles and the respective associated second driving profiles determined during vehicle operation; and the generator is optimized to generate first generated driving profiles that are indistinguishable, by the generator, from second driving profiles determined during vehicle operation.

4. The method as recited in claim 3, wherein the parameters of the generator and the parameters of the discriminator are adjusted depending on a gradient of the objective function.

5. The method as recited in claim 1, wherein the distance includes a statistical distance between a distribution of the respective associated first generated driving profiles and a distribution of the respective associated second driving profiles.

6. The method as recited in claim 1, wherein the objective function includes a Jenson-Shannon divergence or a Wasserstein distance between a distribution of the respective associated first generated driving profiles and a distribution of the respective associated second driving profiles.

7. The method as recited in claim 1, wherein the objective function includes a regularization, or a weight clipping.

8. The method as recited in claim 1, wherein the first travel routes and the second travel routes are data stored in temporal or spatial discretization steps, route characteristics for each route of the first travel routes and second travel routes being stored for each route in each discretization step.

9. The method as recited in claim 8, wherein the route characteristics include geographic characteristics, and/or characteristics of the traffic flow, and/or roadway characteristics, and/or characteristics of the traffic management and/or weather characteristics of the route.

10. The method as recited in claim 8, wherein the route characteristics of the first travel routes are generated at least in part by a neural network.

11. The method as recited in claim 1, wherein the input variables of the generator and the input variables of the discriminator further include driver characteristics and/or vehicle characteristics.

12. The method as recited in claim 1, wherein the generator receives random variables from a random generator as further input variables and generates the first driving profiles corresponding to the respective first travel routes as a function of the first travel routes and the random variables.

13. The method as recited in claim 12, wherein the random variables are global random vectors, or temporary random vectors or local random vectors.

14. The method as recited in claim 12, wherein the random variables are a combination of global and of temporary or local random vectors.

15. The method as recited in claim 1, wherein the generator and/or the discriminator is a recurrent neural network.

16. The method as recited in claim 15, wherein the generator is a bidirectional recurrent neural network.

17. The method as recited in claim 1, wherein for generation of the respective associated first generated driving profiles by the generator, route characteristics of the first travel routes in one specific discretization step are supplemented or expanded by route characteristics of a following discretization step.

18. The method as recited in claim 1, further comprising generating the driving profiles of the vehicle by the generator of the trained machine learning system.

19. The method as recited in claim 18, further comprising simulating emissions of the vehicle using the generated driving profiles of the vehicle, and ascertaining route-specific emissions as a function of the simulation.

20. The method as recited in claim 19, wherein, in the simulation, a model of a drive system of the vehicle is calculated.

21. The method as recited in claim 20, wherein the model of the drive system of the vehicle includes sub-models that describe a motor and an exhaust-gas treatment system of the drive system.

22. The method as recited in claim 20, further comprising adjusting the drive system of the vehicle as a function of the ascertained route-specific emissions.

23. The method as recited in claim 22, wherein the adjustment includes:

adjusting components or parameters during a development of the drive system;

adjusting data in an application of the drive system; or adjusting controlled variables during operation of the drive system in the vehicle.

24. A non-transitory machine-readable storage medium on which is stored a computer program that is executable by a computer and that, when executed by the computer, causes the computer to perform a method for a vehicle, the method comprising:

training a machine learning system to generate driving profiles of the vehicle, the training including the following steps:

selecting first travel routes from a first database, the first travel routes being automatically generated routes;

receiving, by a generator of the machine learning system, the first travel routes as input variables and generating, by the generator, a respective associated first generated driving profile for each of the first travel routes;

storing, in a second database, second travel routes and respective associated second driving profiles determined during vehicle operation, each of the respective associated second driving profiles being determined using sensors of a first vehicle during actual travel by the first vehicle through the respective second travel route;

selecting, from the second database, a plurality of the second travel routes and respective associated second driving profiles determined during vehicle operation;

receiving, by a discriminator of the machine learning system, as input variables: (i) pairs, each made up of one of the first travel routes and the respective associated first generated driving profile, and (ii) pairs each made up of one of the selected second travel routes and the respective associated second driving profile determined during vehicle operation;

determining by the discriminator, depending on the input variables received by the discriminator, outputs which, for each pair received as input variables, characterize whether it is a pair having a first generated driving profile or a pair having a second driving profile determined during vehicle operation; and optimizing an objective function depending on the outputs of the discriminator, the objective function characterizing a distance between (i) distribution of the pairs having the respective associated first generated driving profiles, and (ii) a distribution of the pairs having the respective associated second driving profiles determined during vehicle operation, wherein the objective function is a loss function, and the optimizing is includes adjusting parameters of the generator and parameters of the discriminator to minimize the loss function.

\* \* \* \* \*